P. F. KOSHOLLEK.
MOTOR VEHICLE.
APPLICATION FILED MAR. 26, 1917.
1,245,158. Patented Nov. 6, 1917.
3 SHEETS—SHEET 1.
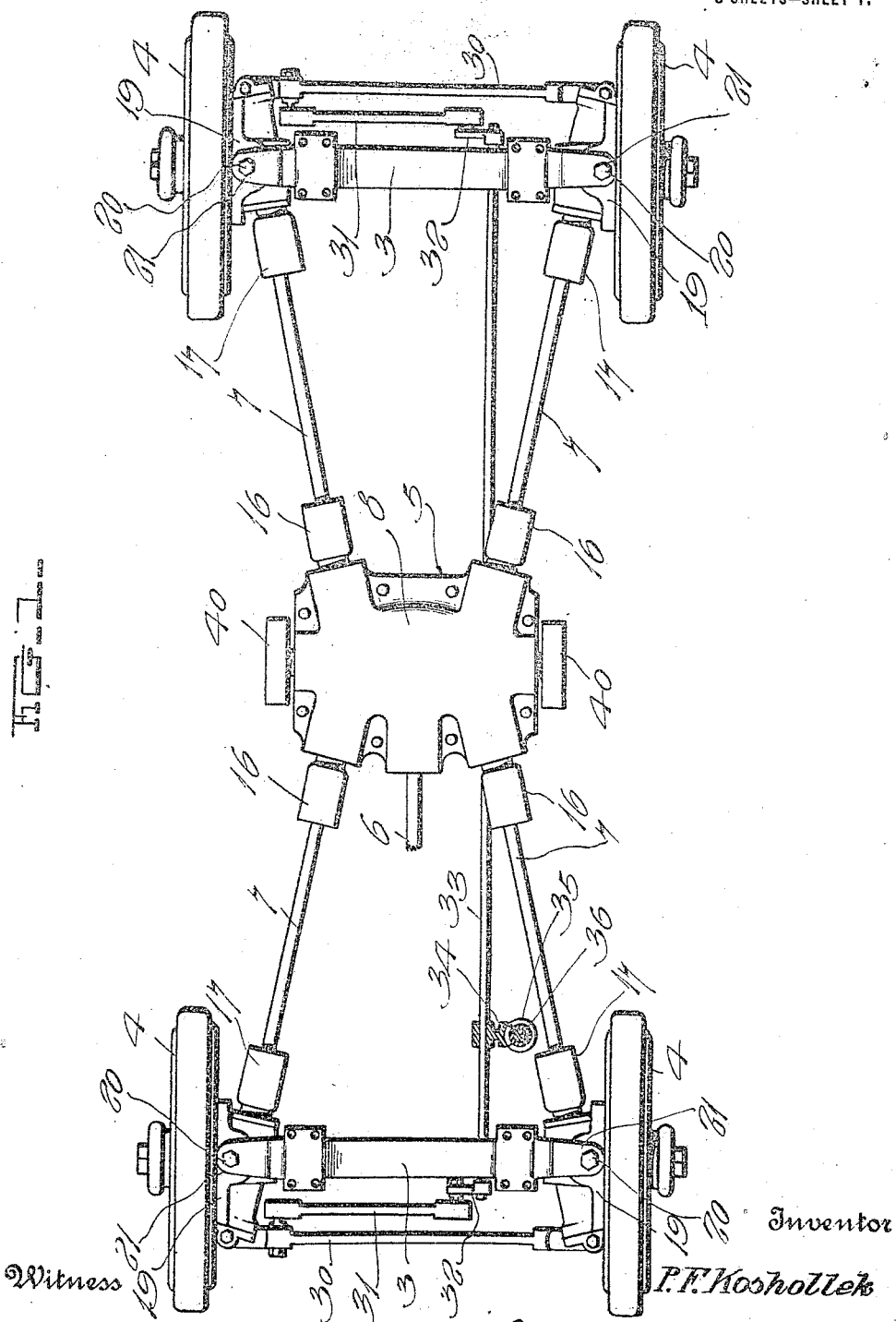
Witness
H. Woodard
Inventor
P. F. Koshollek
By H. B. Willson &co
Attorneys

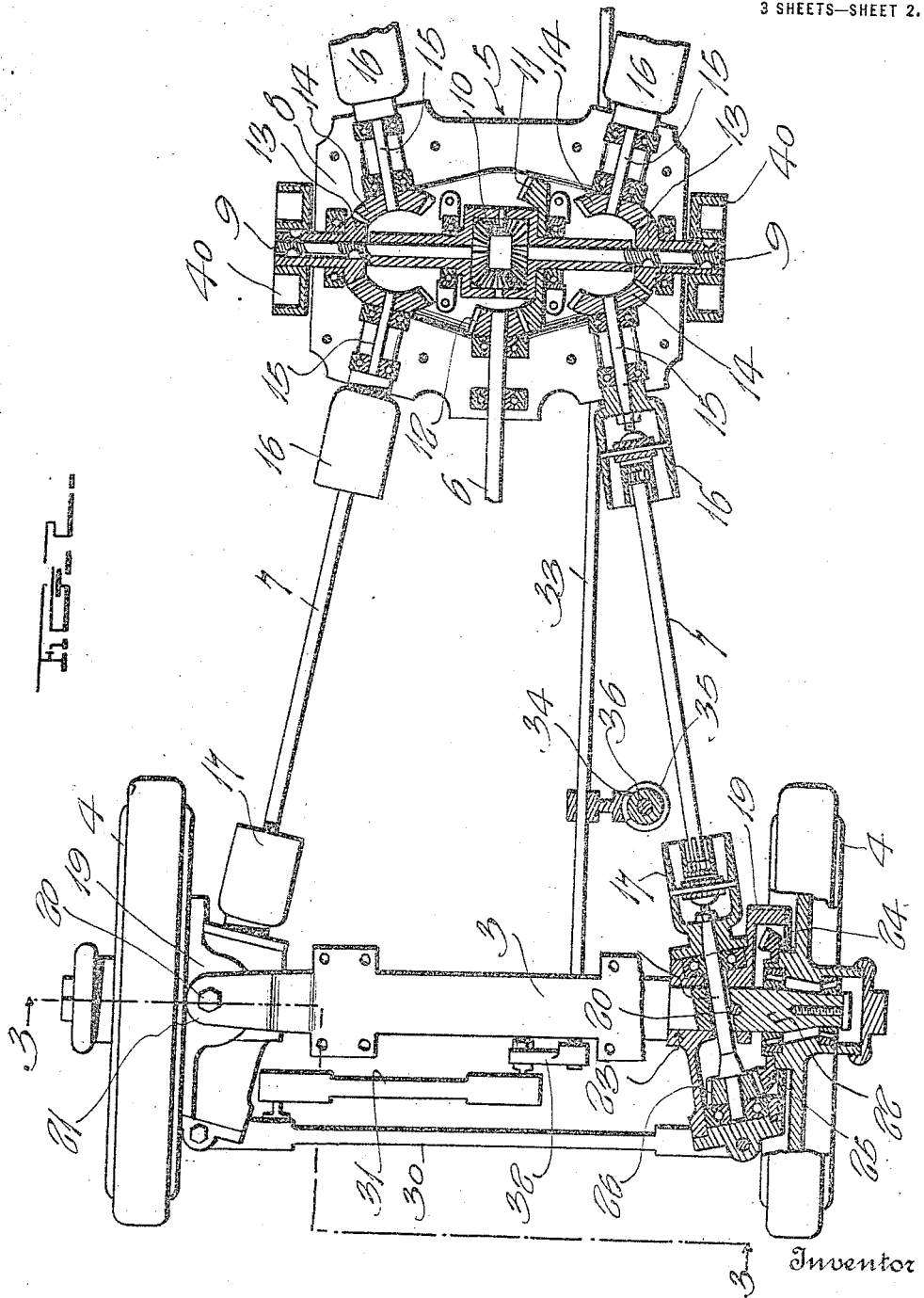

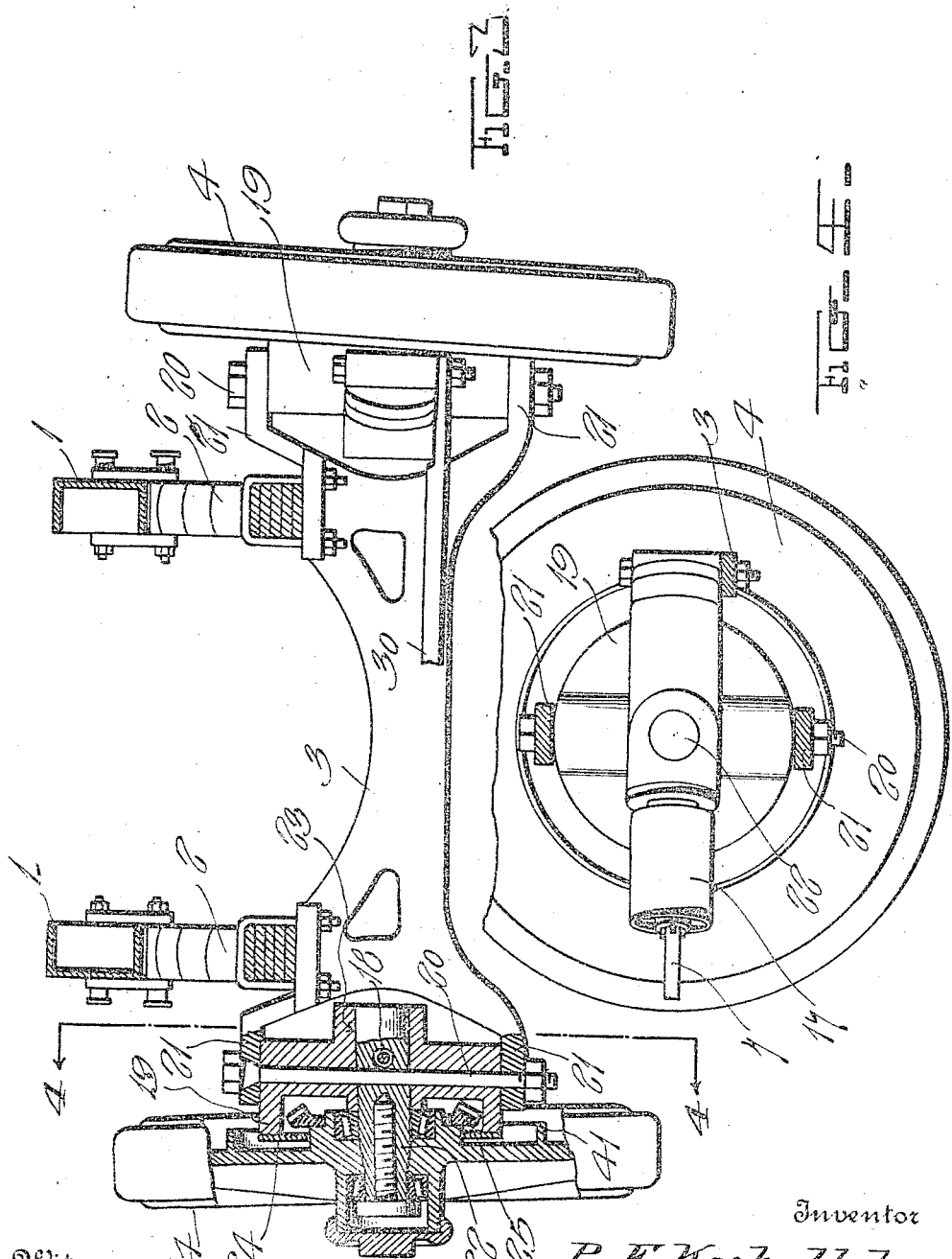

UNITED STATES PATENT OFFICE.

PAUL F. KOSHOLLEK, OF STEVENS POINT, WISCONSIN.

MOTOR-VEHICLE.

1,245,158.

Specification of Letters Patent.

Patented Nov. 6, 1917.

Application filed March 28, 1917. Serial No. 157,524.

*To all whom it may concern:*

Be it known that I, PAUL F. KOSHOLLEK, a subject of the Emperor of Germany, residing at Stevens Point, in the county of Portage and State of Wisconsin, have invented certain new and useful Improvements in Motor-Vehicles; and I do declare the following to be a full, clear, and exact description of the invention, such as will enable others skilled in the art to which it appertains to make and use the same.

My invention has for its principal object to provide an improved means for driving motor vehicles, consisting essentially of a differential, a plurality of longitudinal drive shafts leading therefrom to the four wheels of the machine, and means for steering all of said wheels simultaneously.

A further object is to so locate the differential as to permit all of said drive shafts to be of uniform length in order that the torsional strain thereon may be equalized to equally distribute the driving power to all four wheels.

Yet another object is to so arrange the several parts of the device as to permit the front and rear axles and their respective drive shafts to float freely.

With the foregoing general objects in view, the invention resides in certain novel features of construction and unique combinations of parts to be hereinafter fully described and claimed, the descriptive matter being supplemented by the accompanying drawings which constitute a part of this application and in which:

Figure 1 is a top plan view of the running gear or chassis of the improved vehicle;

Fig. 2 is a view similar to Fig. 1 on an enlarged scale with parts broken away and in section;

Fig. 3 is a transverse section on the plane of the line 3—3 of Fig. 2;

Fig. 4 is a detail vertical section on the plane of the line 4—4 of Fig. 3.

In the drawings above briefly described, the numeral 1 has reference to a horizontal chassis frame supported by springs 2 from front and rear axles 3, the ends of said axles carrying suitable wheels 4 mounted in a manner to be described for horizontal turning. A differential 5 is mounted on the frame 1 at the longitudinal center thereof and is driven by means of a shaft 6 from any suitable type of motor, said differential serving to transfer power from said motor to front and rear pairs of longitudinally disposed drive shafts 7 which lead to the front and rear wheels, said shafts being universally mounted at both ends and having a slight sliding movement so as to permit free floating of the two axles.

The housing 8 of the differential is secured in any suitable manner to the frame 1 and carries appropriate bearings for a pair of transversely extending alined shafts 9, the inner ends of said shafts being connected by differential gearing 10 having the usual driving gear 11 in mesh with a pinion 12 on the shaft 6. Each shaft 9 carries a beveled pinion 13 and front and rear similar pinions 14 mesh therewith, said last named pinions being carried by longitudinally disposed shafts 15 rotatably mounted in suitable bearings in the sides of the housing 8. The outer ends of the shafts 15 are connected by universal joints 16 to the inner ends of the drive shafts 7 and as shown clearly in Fig. 2 said drive shafts are permitted a slight sliding movement in said joints.

The outer ends of the shafts 7 are slidable in universal joints 17 by which they are connected to short extension drive shafts 18, said last named shafts passing through the inner sides of housings 19 into the interior of the latter, said housings being mounted on vertical king bolts 20 in forks 21 on the ends of the axles 3 and having outwardly projecting spindles 22 upon which the wheels 4 are mounted. The shafts 18 as well as the bolts 20 preferably pass through the inner ends of the spindles 22 as shown in Figs. 2 and 3 to hold said spindles within bores 23 formed through the inner ends of the housings 19, the outer ends of said housings being closed by suitable plates 24 in running contact with the hubs of the wheels. The hub of each wheel is provided on its inner end with a beveled gear ring 25, all of said rings being received in the housings 19 with their teeth in mesh with driving pinions 26 on the ends of the extension drive shafts 18.

The arrangement of parts so far described transmits power to the four wheels and permits of turning thereof to steer the machine, this power being transmitted uniformly to all of said wheels since the central location of the differential 5 permits all of the drive shafts 7 to be of uniform length and thus the torsional strain on each is the same. Were the differential positioned farther to the front or to the rear, one pair of drive shafts would necessarily be longer than the other and thus, due to the increased twisting or torsional movement of the longer shafts, the driving means operated by the shorter shafts would be overworked whereas the others would accomplish only a minimum amount of driving. The location of the differential at the longitudinal center of the chassis, that is, at the longitudinal center of the wheel base of said chassis, therefore constitutes an important feature of my invention not only on account of the equalization of driving power, but because of the fact that both the front and the rear axles are permitted to float to the same degree.

For steering the vehicle, the housings 19 of the two front wheels and those of the rear wheels are connected by bridle bars 30 pivotally connected thereto and links 31 are provided to transmit movement to said bridle bars from crank arms 32 on the ends of a longitudinal shaft 33 mounted on the frame 1, a worm gear 34 and a worm 35 being provided for turning said shaft at will, said worm being carried on the lower end of a suitable steering post 36. By this arrangement of parts a steering gear is provided which will simultaneously set the front and rear wheels for turning the vehicle and causing both sets of said wheels to travel on the same arc, thus permitting turning in an extremely short space and preventing the rear wheels from striking any obstacles which are cleared by the front wheels.

Any preferred brake mechanism may be employed upon the improved vehicle but the outer ends of the shafts 9 are preferably equipped with brake drums 40 whereas similar drums 41 will be carried by the four wheels. The brakes coacting with these drums may be made to operate in unison or separately as occasion may demand.

From the foregoing, taken in connection with the accompanying drawings, it will be observed that although the invention is of extremely simple and inexpensive nature, it will be a highly efficient vehicle. For these reasons, the construction shown constitutes the preferred form of the machine although it is to be understood that within the scope of the invention as claimed, numerous minor changes may be made without sacrificing the principal advantages.

I claim:

1. In a vehicle drive, an axle, a pair of housings adjacent the ends thereof, the inner ends of said housings having seats, spindles having their inner ends received in said seats, vertical king bolts passing through the housings and the axle for pivoting the former to the latter, said king bolts also extending through said spindles to retain them in said seats, wheels mounted on said spindles and having gear rings on the inner ends of their hubs received in said housings, pinions in said housings meshing with said gears for driving the same, and means for driving said pinions.

2. In a vehicle, the combination of an axle, a pair of horizontally swinging members adjacent the ends thereof and having horizontally extending seats, spindles whose inner ends are received snugly in said seats, vertical king bolts passing through the axle and through said members to pivot the latter to the former, said bolts likewise extending through said spindles to retain them in said seats, and wheels rotatably mounted on said spindles.

In testimony whereof I have hereunto set my hand in the presence of two subscribing witnesses.

PAUL F. KOSHOLLEK.

Witnesses:
W. B. MURAZ,
NELLIE LEAHY.